United States Patent [19]

Wilhelm

[11] 3,951,868

[45] Apr. 20, 1976

[54] HYDROCARBON CONVERSION CATALYST

[75] Inventor: Frederick C. Wilhelm, Arlington Heights, Ill.

[73] Assignee: Universal Oil Products Company, Des Plaines, Ill.

[22] Filed: Mar. 14, 1975

[21] Appl. No.: 558,521

Related U.S. Application Data

[60] Division of Ser. No. 448,131, March 4, 1974, Pat. No. 3,892,657, which is a continuation-in-part of Ser. No. 272,582, July 17, 1972, abandoned, which is a division of Ser. No. 114,719, Feb. 11, 1971, abandoned.

[52] U.S. Cl. .......................... 252/466 PT; 252/439; 252/442
[51] Int. Cl.² ...................... B01J 21/04; B01J 23/62
[58] Field of Search .............. 252/439, 442, 466 PT

[56] References Cited
UNITED STATES PATENTS

| | | | |
|---|---|---|---|
| 2,914,464 | 11/1959 | Burton et al. | 208/138 |
| 3,578,584 | 5/1971 | Hayes | 252/466 PT |
| 3,793,232 | 2/1974 | Duhaut et al. | 252/466 PT |

Primary Examiner—W. J. Shine
Attorney, Agent, or Firm—James R. Hoatson, Jr.; Thomas K. McBride; William H. Page, II

[57] ABSTRACT

Hydrocarbons are converted by contacting them at hydrocarbon conversion conditions with a bimetallic acidic catalytic composite comprising a combination of catalytically effective amounts of a platinum group component, an indium component and a halogen component with a porous carrier material. The platinum group component and halogen component are present in the bimetallic catalyst in amounts respectively, calculated on an elemental basis, corresponding to about 0.01 to about 2 wt. % platinum group metal and about 0.1 to about 3.5 wt. % halogen. The indium component is present in amounts corresponding to an atomic ratio of indium to platinum group metal of about 0.1:1 to about 1:1. Moreover, the platinum group and indium components are uniformly dispersed throughout the porous carrier material in carefully controlled oxidation states such that substantially all of the platinum group component is present therein in the corresponding elemental metallic state while substantially all of the indium component is present therein in an oxidation state above that of the corresponding metal. A specific example of the type of hydrocarbon conversion process disclosed is a process for the catalytic reforming of a low-octane gasoline fraction wherein the gasoline fraction and hydrogen stream are contacted with the novel acidic bimetallic catalyst disclosed herein at reforming conditions. Also disclosed is a novel trimetallic catalyst comprising a combination of a Group IVA metallic component with the acidic bimetallic catalyst.

12 Claims, No Drawings

HYDROCARBON CONVERSION CATALYST

CROSS-REFERENCES TO RELATED APPLICATIONS

This application is a division of prior application Ser. No. 448,131, filed Mar. 4, 1974, now U.S. Pat. No. 3,892,657 which, in turn, is a continuation-in-part of my prior, now abandoned application Ser. No. 272,582 filed July 17, 1972 which in turn is a division of my prior, now abandoned application Ser. No. 114,719 filed Feb. 11, 1971. All of the teachings of these prior applications are specifically incorporated herein by reference.

The subject of the present invention is a novel acidic bimetallic catalytic composite which has exceptional activity, selectivity and resistance to deactivation when employed in a hydrocarbon conversion process that requires a catalyst having both a hydrogenation-dehydrogenation function and a selective acid or cracking function. More precisely, the present invention involves a novel dual-function acidic bimetallic catalytic composite which beneficially utilizes an indium component to interact with a platinum group metal-containing acidic catalyst to enable substantial improvements in hydrocarbon conversion processes of the type that have traditionally utilized platinum group metal-containing catalysts to accelerate the various hydrocarbon conversion reactions associated therewith. In another aspect this invention involves the improved processes that are produced by the use of an acidic bimetallic catalytic composite comprising a combination of a platinum group component, an indium component and a halogen component with a porous, high surface area carrier material in a manner such that: (1) the platinum group and indium components are uniformly dispersed throughout the porous carrier material, (2) the amount of the indium component is not significantly greater than the amount of the platinum group component on an atomic basis, and (3) substantially all of the platinum group component is present therein as the corresponding metal while substantially all of the indium component is present therein in an oxidation state above that of the corresponding elemental metal. In a specific aspect, the present invention concerns an improved reforming process which utilizes the subject acidic bimetallic catalyst to markedly improve activity, selectivity and stability characteristics associated therewith, to increase yields of $C_5+$ reformate and of hydrogen recovered therefrom and to allow operation thereof at high severity conditions not heretofore generally employed in the art of continuous catalytic reforming of hydrocarbons with a platinum-containing monometallic, dual-function catalyst. One preferred aspect of the present invention relates to the use of a Group IVA metallic component in the discosed catalytic composite.

Composites having a hydrogenation-dehydrogenation function and a selective acid or cracking function are widely used today as catalysts in many industries, such as the petroleum and petrochemical industry, to accelerate a wide spectrum of hydrocarbon conversion reactions. Generally, the cracking function is thought to be associated wtih an acid-acting material of the porous adsorptive, refractory oxide type which is typically utilized as the support or carrier for a heavy metallic component such as the metals or compounds of metals of the transition elements of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, halogenation, hydrogenolysis, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins, and the like reactions to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is a hydroisomerization process wherein a hydrocarbon fraction which is relatively rich in straight-chain paraffin and/or olefinic compounds are contacted with a dual-function catalyst to produce an output stream rich in isoparaffin compounds.

Regardless of the reaction involved or the particular process involved, it is of critical importance that the dual-function catalyst exhibit not only the capability to initially perform its specified functions but also that it has the capability to perform them satisfactorily for prolonged periods of time. The analytical terms used in the art to measure how well a particular catalyst performs its intended functions in a particular hydrocarbon reaction environment are activity, selectivity and stability. And for purposes of discussion here these terms are conveniently defined for a given charge stock as follows: (1) activity is a measure of the catalyst's ability to convert hydrocarbon reactants into products at a specified severity level where severity level means the reaction conditions used — that is, the temperature, pressure, contact time, and presence of diluents such as $H_2$: (2) selectivity refers to the amount of desired product or products obtained relative to the amount of reactants converted or charged; (3) stability refers to the rate of change with time of the activity and selectivity parameters — obviously, the smaller rate implying the more stable catalyst. In a reforming process, for example, activity commonly refers to the amount of conversion that takes place for a given charge stock at a specified severity level and is typically measured by octane number of the $C_5+$ product stream; selectivity usually refers to the amount of $C_5+$ yield that is obtained at the particular severity or activity level relative to the amount of the charge stock; and stability is typically equated to the rate of change with time of activity, as measured by octane number of $C_5+$ product and of selectivity, as measured by $C_5+$ yield. Actually, this last statement is not strictly correct because generally a continuous reforming process is run to produce a constant octane $C_5+$ product with a severity level being continuously adjusted to attain this result; and, furthermore, the severity level is for this process usually varied by adjusting the conversion temperature in the reaction zone so that, in point of fact, the rate of change of activity finds response in the rate of change of conversion temperature and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of formation of these carbonaceous materials on the catalyst. Viewed in terms of performance parameters, the problem is to develop a dual-function catalyst having superior activity, selectivity and stability. In particular, for a reforming process the problem is typically expressed in terms of shifting and stabilizing the $C_5+$ yield-octane relationship — $C_5+$ yield being representative of selectivity and octane being proportional to activity.

I have now found a dual-function catalytic composite which possesses improved activity, selectivity and stabiltiy when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, disproportionation, polymerization, oligomerization, hydrodealkylation, transalkylation, cyclization, dehydrocyclization, cracking, hydrocracking, reforming, hydrogenation, halogenation, and the like processes. In particular, I have ascertained that the use of an acidic bimetallic catalytic composite, comprising a combination of a platinum group component, an indium component and a halogen component with a porous refractory carrier material, can enable the performance of a hydrocarbon conversion process utilizing a dual-function catalyst to be substantially improved, provided the amounts and oxidation states of the metallic components and the distribution thereof in the catalytic composite are carefully controlled in the manner indicated herein. The art has on occassion hinted at or suggested the use of a Group III metallic element to modify or attenuate the platinum component of a dual-function catalyst. For examples of these suggestions, reference may be had to the teachings of U.S. Pat. Nos. 2,914,464 and 2,814,599. However, the art has apparently never recognized the particular conditions which enable indium to promote a platinum group metal-containing catalyst; that is, to simultaneously increase its activity, selectivity and stability in hydrocarbon conversion service. In particular, the art has apparently never specifically demonstrated the beneficial use of a platinum-indium catalyst in a catalytic reforming process. I have now discerned that the presence of indium in a catalyst containing a platinum group component can be very beneficial under certain conditions. One essential condition associated with the acquisition of the beneficial effect of indium on a platinum group metal-containing catalyst is the atomic ratio of indium to platinum group metal contained in the composite; my findings here indicate that it is only when this ratio is about 0.1:1 to about 1:1 that the beneficial interaction of indium with the platinum group metal is obtained. A second condition is the presence of a halogen component; my finding on this matter is that the presence of a relatively small amount of halogen is required to see the beneficial effect. Another condition for achieving this beneficial interaction of indium with this type of catalyst is the distribution of the indium and platinum group metal components in the carrier material with which they are combined; my finding here is that it is essential that these components be uniformly dispersed throughout the porous carrier material — that is, the concentration of these components is approximately the same in any reasonably divisible portion thereof. Still another condition for this beneficial effect is the oxidation states of the metallic components; my finding here is that it is essential that substantially all of the platinum group metal is present in the composite in the corresponding elemental metallic state while substantially all of the indium component is present in a positive oxidation state. A bimetallic acidic catalyst meeting these essential limitations differs sharply both in substance and in capabilities from the indium- and platinum-containing catalysts that are suggested by the prior art. Moreover, I have additionally discerned that superior results are obtained with this acidic indium-containing catalyst if a Group IVA metallic component is combined therewith in the manner hereinafter stated.

In the case of a reforming process, one of the principal advantages associated with the use of the instant acidic bimetallic catalyst involves the acquisition of the capability to operate in a stable manner in a high severity operation; for example, a continuous reforming process producing a $C_5+$ reformate having an octane of about 100 F-1 clear and utilizing a relatively low pressure of 50 to about 350 psig. In this latter embodiment the principal effect of the indium component is to stabilize the platinum group component by providing a mechanism for allowing it to better resist the rather severe deactivation normally associated with these conditions. In short, the present invention essentially involves the finding that the addition of a controlled amount of an indium component to a dual-function hydrocarbon conversion catalyst, containing a platinum group component, a halogen component and preferably a Group IVA metallic component, coupled with the uniform distribution of the indium component throughout the catalytic composite to achieve an atomic ratio of indium to platinum group metal of about 0.1:1 to about 1:1 and with careful control of the oxidation states of the metallic components enables the performance characteristics of the catalyst to be sharply and materially improved.

It is, accordingly, one object of the present invention to provide an acidic bimetallic hydrocarbon conversion catalyst having superior performance characteristics when utilized in a hydrocarbon conversion process. A second object is to provide an acidic bimetallic catalyst having dual-function hydrocarbon conversion performance characteristics that are relatively insensitive to the deposition of hydrocarbonaceous material thereon. A third object is to provide preferred methods of preparation of this bimetallic catalytic composite which insures the achievement and maintenance of its beneficial properties. Another object is to provide an improved reforming catalyst having superior activity, selectivity and stability when employed in a low pressure reforming process. Yet another object is to provide a dual-function hydrocarbon conversion catalyst which utilizes a relatively inexpensive component, indium, to promote and stabilize a platinum group metal component and preferably a Group IVA metallic component. Still another object is to provide a method of preparation of an indium-containing bimetallic catalyst which insures the indium component is in a highly dispersed metallic state during use in the conversion of hydrocarbons.

In brief summary, the present invention is, in one embodiment a catalytic composite comprising a porous carrier material containing, on an elemental basis, about 0.01 to about 2 wt. % platinum group metal, about 0.1 to about 3.5 wt. % halogen and indium is an amount sufficient to result in an atomic ratio of indium to platinum group metal of about 0.1:1 to about 1:1, wherein the platinum group metal and indium are uniformly dispersed throughout the porous carrier material, wherein substantially all of the platinum group metal is present in the corresponding elemental metallic state and wherein substantially all of the indium is present in an oxidation state above that of the corresponding elemental metal.

A second embodiment relates to a catalytic composite comprising a porous carrier material containing, on an elemental basis, about 0.01 to about 2 wt. % platinum group metal, about 0.1 to about 3.5 wt. % halogen, about 0.01 to about 5 wt. % Group IVA metal, and indium in an amount sufficient to result in an atomic ratio of indium to platinum group metal of about 0.1:1 to about 1:1, wherein substantially all of the platinum group metal is present in the corresponding elemental metallic state, wherein substantially all of the Group IVA metal and indium are present in oxidation states above that of the corresponding elemental metals and wherein the metallic ingredients are uniformly dispersed in the porous carrier material.

Another embodiment relates to a catalytic composite comprising a combination of the catalytic composite described in the first or second embodiment with a sulfur component in an amount sufficient to incorporate about 0.05 to about 0.5 wt. % sulfur, calculated on an elemental basis.

Yet another embodiment relates to a process for the conversion of hydrocarbons comprising contacting the hydrocarbon and hydrogen with the catalytic composite described above in the first or second embodiment at hydrocarbon conversion conditions.

A preferred embodiment relates to a process for reforming a gasoline fraction which comprises contacting the gasoline fraction and hydrogen with the catalytic composite described above in the first or second embodiment at reforming conditions selected to produce a high-octane reformate.

Other objects and embodiments of the present invention relate to additional details regarding preferred catalytic ingredients, preferred amounts of ingredients, suitable methods of composite preparation, operating conditions for use in the hydrocarbon conversion processes, and the like particulars which are hereinafter given in the following detailed discussion of each of these facets of the present invention.

The acidic bimetallic catalyst of the present invention comprises a porous carrier material or support having combined therewith catalytically effective amounts of a platinum group component, an indium component, a halogen component, and in the most preferred case, a Group IVA metallic component.

Considering first the porous carrier material utilized in the present invention, it is preferred that the material be a porous, adsorptive, high-surface area support having a surface area of about 25 to about 500 m$^2$/g. The porous carrier material should be relatively refractory to the conditions utilized in the hydrocarbon conversion process, and it is intended to include within the scope of the present invention carrier material which have traditionally been utilized in dual-function hydrocarbon conversion catalysts such as: (1) activated carbon, coke or charcoal; (2) silica or silica gel, silicon carbide, clays and silicates, including those synthetically-prepared and naturally-occurring, which may or may not be acid treated, for example, attapulgus clay, china clay, diatomaceous earth, fuller's earth, kaoline, kieselguhr, etc.; (3) ceramics, porcelain, crushed firebrick, bauxite; (4) refractory inorganic oxides such as alumina, titanium dioxide, zirconium dioxide, hafnium oxide, beryllium oxide, vanadium oxide, cesium oxide, chromium oxide, zinc oxide, magnesia, thoria, boria, silica-alumina, silica-magnesia, chromia-alumina, alumina-boria, silica-zirconia, etc.; (5) zeolitic crystalline aluminosilicates such as naturally-occurring or synthetically-prepared mordenite and/or faujasite, either in the hydrogen form or in a form which has been treated with multivalent cations; (6) spinels such as $MgAl_2O_4$, $FeAl_2O_4$, $ZnAl_2O_4$, $CaAl_2O_4$, and other like compounds having the formula $MO \cdot Al_2O_3$ where M is a metal having a valence of 2; and (7) combinations of elements from one or more of these groups. The preferred porous carrier materials for use in the present invention are refractory inorganic oxides, with best results obtained with a carrier material consisting essentially of alumina. Suitable alumina materials are the crystalline aluminas known as the gamma-, eta- and theta-alumina, with gamma- or eta-alumina giving best results. In addition, in some embodiments the alumina carrier material may contain minor proportions of other well known refractory inorganic oxides such as silica, zirconia, magnesia, etc.; however, the preferred support is substantially pure gamma-, or eta-alumina. Preferred carrier materials have an apparent bulk density of about 0.3 to about 0.7 g/cc and surface area characteristics such that the average pore diameter is about 20 to 300 Angstroms, the pore volume is about 0.1 to about 1cc/g and the surface area is about 100 to about 500 m$^2$/g. In general, best results are typically obtained with a gamma-alumina carrier material which is used in the form of spherical particles having: a relatively small diameter (i.e. typically about one-sixteenth inch), an apparent bulk density of about 0.5 to about 0.6 g/cc, a pore volume of about 0.4 cc/g. and a surface area of about 175 m$^2$/g.

The preferred alumina carrier material may be prepared in any suitable manner and may be synthetically-prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc.; in an amount to form an aluminum hydroxide gel which upon drying and calcining is converted to alumina. The alumina carrier may be formed in any desired shape such as spheres, pills, cakes, extrudates, powders, granules, tablets, etc., and utilized in any desired size. For the purpose of the present invention a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

An essential constituent of the catalyst of the present invention is an indium component. This component may be present in the instant catalytic composite in any form wherein substantially all of the indium moiety is in an oxidation state above that of the corresponding elemental metal such as a chemical compound like the oxide, sulfide, halide, oxychloride, aluminate, or in chemical combination with one or more of the other ingredients of the catalyst. Although it is not intended to restrict the present invention by this explanation, it is believed that best results are obtained when the indium component is present in the composite in the form of the corresponding indium oxide and the subsequently described oxidation and reduction steps that are preferably used in the preparation of the instant catalytic composite are specifically designed to achieve this end. This indium component can be used in any amount which is catalytically effective and which is sufficient to result in an atomic ratio of indium to platinum group metal which is less than 1.35:1, with best results obtained at an atomic ratio of about 0.1:1 to about 1:1 and more especially at about 1:1.

This indium component may be incorporated in the catalytic composite in any suitable manner known to the art to result in a relatively uniform dispersion of the indium moiety in the carrier material, such as by coprecipitation or cogellation with the porous carrier material, ion exchange with the gelled carrier material, or impregnation with the carrier material either after, before or during the period when it is dried and calcined. It is to be noted that it is intended to include within the scope of the present invention all conventional methods for incorporating and simultaneously uniformly distributing a metallic component in a catalytic composite and the particular method of incorporation used is not deemed to be an essential feature of the present invention. One method of incorporating the indium component into the catalytic composite involves coprecipitating the indium component in the form of the corresponding hydrous oxide during the preparation of the preferred carrier material, alumina. This method typically involves the addition of a suitable soluble indium compound such as indium trichloride, indium nitrate and the like to the alumina hydrosol and then combining the hydrosol with a suitable gelling agent and dropping the resulting mixture into an oil bath, etc., as explained in detail hereinbefore. Alternatively, the indium compound can be added to the gelling agent. After drying and calcining the resulting gelled carrier material in air there is obtained an intimate combination of alumina and indium oxide. A preferred method of incorporating the indium component into the catalytic composite involves utilization of a soluble, decomposable compound of indium to impregnate the porous carrier material. In general, the solvent used in this impregnation step is selected on the basis of the capability to dissolve the desired indium compound and is preferably an aqueous, acidic solution. Thus, the indium component may be added to the carrier material by commingling the latter with an aqueous, acidic solution of suitable indium salt or suitable compound of indium such as indium tribromide, indium perchlorate, indium trichloride, indium trifluoride, indium nitrate, indium sulfate, and the like compounds. A particularly preferred impregnation solution comprises an acidic solution of indium trichloride in water. In general, the indium component can be impregnated either prior to, simultaneously with, or after the other ingredients are added to the carrier material. However, excellent results are obtained when the indium component is impregnated simultaneously with the platinum group component. In fact, a preferred impregnation solution is an aqueous solution of chloroplatinic acid, hydrochloric acid and indium trichloride.

Regardless of which indium compound is used in the preferred impregnation step, it is important that the indium component be uniformly distributed throughout the carrier material. In order to achieve this objective it is necessary to maintain the pH of the impregnation solution in a range of about 7 to about 1 or less, with a preferred range of about 3 to 1, and to dilute the impregnation solution to a volume which is at least equal to the volume of the carrier material which is impregnated. Similarly, it is preferred to use a relatively long contact time during the impregnation step ranging from about 0.25 up to about 1 hour or more before drying to remove excess solvent in order to insure a high dispersion of the indium component on the carrier material. The mixture of solution and carrier material is, likewise, preferably constantly agitated during this preferred impregnation step.

A second essential ingredient of the subject catalyst is the platinum group component. That is, it is intended to cover the use of platinum or palladium or iridium or rhodium or osmium or ruthenium or mixtures thereof as a second component of the present composite. It is an essential feature of the present invention that substantially all of the platinum group component exists within the final catalytic composite in the elemental metallic state (i.e. as elemental platinum or palladium or iridium etc.). Generally the amount of the second component used in the final composite is relatively small compared to the amount of the other components combined therewith. In fact, the platinum group component generally will comprise about 0.01 to about 2 wt. % of the final catalytic composite, calculated on an elemental basis. Excellent results are obtained when the catalyst contains about 0.05 to about 1 wt. % of platinum, iridium or palladium metal.

This platinum group component may be incorporated in the catalytic composite in any suitable manner known to result in a relatively uniform distribution of this component in the carrier material such as coprecipitation or cogellation, ion-exchange or impregnation. The preferred method of preparing the catalyst involves the utilization of a soluble, decomposable compound of a platinum group metal to impregnate the carrier material in a relatively uniform manner. For example, this component may be added to the support by commingling the latter with an aqueous solution of chloroplatinic, chloroiridic or chloropalladic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, tetramine platinum chloride, palladium chloride, palladium nitrate, palladium sulfate, etc. The utilization of a platinum group metal chloride compound, such as chloroplatinic, chloroiridic, or chloropalladic acid, is preferred since it facilitates the incorporation of both the platinum group component and at least a minor quantity of the halogen component in a single step. Hydrogen chloride or the like acid is also generally added to the impregnation solution in order to further facilitate the incorporation of the halogen component and the uniform distribution of the metallic component throughout the carrier material. In addition, it is generally preferred to impregnate the carrier material after it has been calcined in order to minimize the risk of washing away the valuable platinum or palladium compounds; however, in some cases it may be advantageous to impregnate the carrier material when it is in a gelled state.

It is essential to incorporate a halogen component into the bimetallic catalytic composite of the present invention. Although the precise form of the chemistry of the association of the halogen component with the carrier material is not entirely known, it is customary in the art to refer to the halogen component as being combined with the carrier material, or with other ingredients of the catalyst in the form of the halide (e.g. as the combined chloride). This combined halogen may be either fluorine, chlorine, bromine or mixtures thereof. Of these fluorine and, particularly, chlorine are preferred for this purpose of the present invention. The halogen may be added to the carrier material in any suitable manner, either during preparation of the support or before or after the addition of the other components. For example, the halogen may be added, at any stage of the preparation of the carrier material or to the calcined carrier material, as an aqueous solution of a suitable, decomposable halogen-containing compound such as hydrogen fluoride, hydrogen chloride, hydrogen bromide, ammonium chloride, etc. The halogen component or a portion thereof, may be combined with the carrier material during the impregnation of the latter with the metallic components; for example, through the utilization of a mixture of chloroplatinic acid, indium trichloride and hydrogen chloride. In another situation, the alumina hydrosol which is typically utilized to form the preferred alumina carrier mateial may contain halogen and thus contribute at least a portion of the halogen component to the final composite. For reforming, the halogen will be typically combined with the carrier material in an amount sufficient to result in a final composite that contains about 0.1 to about 3.5% and preferably about 0.5 to about 1.5% by weight of halogen, calculated on an elemental basis. In isomerization or hydrocracking embodiments, it is generally preferred to utilize relatively larger amounts of halogen in the catalyst — typically, ranging up to about 10 wt. % halogen, calculated on an elemental basis, and more preferably about 1 to about 5 wt. %.

A preferred constituent of the instant multimetallic catalytic composite is the Group IVA metallic component. By the use of the generic term "Group IVA metallic component" it is intended to cover the metals of Group IVA of the Periodic Table. More specifically, it is intended to cover: germanium, tin, lead and mixtures of these metals. It is an essential feature of the present invention that substantially all of the Group IVA metallic component is present in the final catalyst in an oxidation state above that of the elemental metal. In other words, this component may be present in chemical combination with one or more of the other ingredients of the composite, or as a chemical compound of the Group IVA metal such as the oxide, sulfide, halide, oxyhalide, oxychloride, aluminate, and the like compounds. Based on the evidence currently available, it is believed that best results are obtained when substantially all of the Group IVA metallic component exists in the final composite in the form of the corresponding oxide such as the tin oxide, germanium oxide and lead oxide, and the subsequently described oxidation and reduction steps, that are preferably used in the preparation of the instant composite, are believed to result in a catalytic composite which contains an oxide of the Group IVA metallic component. Regardless of the state in which this component exists in the composite, it can be utilized therein in any amount which is catalytically effective, with the preferred amount being about 0.01 to about 5 wt. % thereof, calculated on an elemental basis and the most preferred amount being about 0.05 to about 2 wt. %. The exact amount selected within this broad range is preferably determined as a function of the particular Group IVA metal that is utilized. For instance, in the case where this component is lead, it is preferred to select the amount of this component from the low end of this range — namely about 0.01 to about 1 wt. %. Additionally, it is preferred to select the amount of lead as a function of the amount of the platinum group component as explained hereinafter. In the case where this component is tin, it is preferred to select from a relatively broader range of about 0.05 to about 2 wt. % thereof. And, in the case where this component is germanium, the selection can be made from the full breadth of the stated range — specifically, about 0.01 to about 5 wt. %, with best results at about 0.05 to about 2 wt. %.

This Group IVA component may be incorporated in the composite in any suitable manner known to the art to result in a uniform dispersion of the Group IVA moiety throughout the carrier material such as, coprecipitation or cogellation with the porous carrier material, ion exchange with the carrier material, or impregnation of the carrier material at any stage in its preparation. It is to be noted that it is intended to include within the scope of the present invention all conventional procedures for incorporating a metallic component in a catalytic composite, and the particular method of incorporation used is not deemed to be an essential feature of the present invention so long as the Group IVA component is uniformly distributed throughout the porous carrier material. One acceptable method of incorporating the Group IVA component into the catalytic composite involves cogelling the Group IVA component during the preparation of the preferred carrier material, alumina. This method typically involves the addition of a suitable soluble compound of the Group IVA metal of interest to the alumina hydrosol. The resulting mixture is then commingled with a suitable gelling agent, such as a relatively weak alkaline reagent, and the resulting mixture is thereafter preferably gelled by dropping into a hot oil bath as explained hereinbefore. After aging, drying and calcining the resulting particles there is obtained an intimate combination of the oxide of the Group IVA metal and alumina. One preferred method of incorporating this component into the composite involves utilization of a soluble decomposable compound of the particular Group IVA metal of interest to impregnate the porous carrier material either before, during or after the carrier material is calcined. In general, the solvent used during this impregnation step is selected on the basis of its capability to dissolve the desired Group IVA compound without affecting the porous carrier material which is to be impregnated; ordinarily, good results are obtained when water is the solvent; thus the preferred Group IVA compounds for use in this impregnation step are typically water-soluble and decomposable. Examples of suitable Group IVA compounds are: germanium difluoride, germanium tetraalkoxide, germanium dioxide, germanium tetrafluoride, germanium monosulfide, tin chloride, tin bromide, tin dibromide di-iodide, tin dichloride di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the Group IVA component is germanium, a preferred impregnation solution is germanium tetrachloride dissolved in anhydrous alcohol. In the case of tin, tin chloride dissolved in water is preferred. In the case of lead, lead nitrate dissolved in water is preferred. Regardless of which impregnation solution is utilized, the Group IVA component can be impregnated either prior to, simultaneously with, or after the other metallic components are added to the carrier material. Ordinarily, best results are obtained when this component is impregnated simultaneously with the other metallic components of the composite. Likewise, best results are obtained when the Group IVA component is germanium oxide or tin oxide.

Regardless of which Group IVA compound is used in the preferred impregnation step, it is essential that the Group IVA metallic component be uniformly distributed throughout the carrier material. In order to achieve this objective this component is incorporated by impregnation, it is necessary to maintain the pH of the impregnation solution at a relatively low level corresponding to about 3 to about 1 or less and to dilute the impregnation solution to a volume which is at least approximately the same or greater than the volume of the carrier material which is impregnated. It is preferred to use a volume ratio of impregnation solution to carrier material of at least 1:1 and preferably about 2:1 to about 10:1 or more. Similarly, it is preferred to use a relatively long contact time during the impregnation step ranging from about one-fourth hour up to about one-half hour or more before drying to remove excess solvent in order to insure a high dispersion of the Group IVA metallic component in the carrier material. The carrier material is, likewise, preferably constantly agitated during this preferred impregnation step.

In embodiments of the present invention wherein the instant catalytic composite is used for dehydrogenation of dehydrogenatable hydrocarbons or for the hydrogenation of hydrogenatable hydrocarbons, it is ordinarily a preferred practice to include an alkali or alkaline earth metal component in the composite and to maintain the halogen component at the lowest possible effective value (i.e. about 0.1 wt. %). More precisely, this optional component is selected from the group consisting of the compounds (particularly the corresponding oxides) of the alkali metals — cesium, rubidium, sodium, and lithium — and the compounds of the alkaline earth metals — calcium, strontium, barium and magnesium. Generally good results are obtained in these embodiments when this component is present in the form of the corresponding basic oxide and when it constitutes about 0.1 to about 5 wt. % of the composite, calculated on an elemental basis. Thus in dehydrogenation or hydrogenation embodiments the catalyst of the present invention is a combination of catalytically effective amounts of a platinum group component, an indium component and an alkali or alkaline earth component with a porous carrier material. This component can be incorporated in the composite in any manner known to the art, with impregnation with an aqueous solution of a suitable water-soluble, decomposable compound being most preferred.

Another optional ingredient of the catalyst of the present invention is a Friedel-Crafts metal halide component. This ingredient is particularly useful in hydrocarbon conversion embodiments of the present invention wherein it is preferred that the catalyst utilized has a strong acid or cracking function associated therewith — for example, an embodiment wherein hydrocarbons are to be hydrocracked or isomerized with the catalyst of the present invention. Suitable metal halides of the Friedel-Crafts type include aluminum chloride, aluminum bromide, ferric chloride, ferric bromide, tin chloride, zinc chloride, and the like compounds with the aluminum halides, particularly aluminum chloride, ordinarily yielding best results. Generally, this optional ingredient can be incorporated into the composite of the present invention by any of the conventional methods for adding metallic halides of this type; however, best results are ordinarily obtained when the metallic halide is sublimed onto the surface of the carrier material according to the preferred method disclosed in U.S. Pat. No. 2,999,074. The component can generally be utilized in any amount which is catalytically effective, with a value selected from the range of about 1 to about 100 wt. % of the carrier material generally being preferred.

Concerning the preferred amount of the indium component of the instant catalyst, I have discerned that it is essential to specify the amount of the indium component as a function of the amount of the platinum group component. In other words, it is an essential feature of the present invention that the amount of the indium component is selected so that the atomic ratio of indium to platinum group metal is less than 1.35:1, with best results obtained in the range of about 0.1:1 to 1:1 and especially at about 1:1. Likewise, best results are obtained if a Group IVA metallic component is utilized when the atomic ratio of Group IVA metal to platinum group metal is about 0.05:1 to about 10:1.

Another significant parameter for the subject catalyst is the "total metals content" which is defined to be the sum of the platinum group component and the indium component calculated on an elemental metal basis. Good results are ordinarily obtained with the subject catalyst when this parameter is fixed at a value of about 0.2 to about 2 wt. %, with best results ordinarily achieved as a metals loading of about 0.3 to about 1 wt. %.

Integrating the above discussion of each of the essential and preferred components of the catalytic composite, it is evident that a particularly preferred catalytic composite for use in catalytic reforming comprises a combination of catalytically effective amounts of a platinum component, an indium component, a halogen component and a Group IVA metallic component with an alumina carrier material in amounts sufficient to result in the composite containing about 0.5 to about 1.5 wt. % halogen, about 0.05 to about 1 wt. % platinum, about 0.05 to about 2 wt. % Group IVA metal, and indium in an amount sufficient to result in an atomic ratio of indium to platinum of about 0.1:1 to about 1:1. Specific examples of especially preferred catalytic composites are, accordingly, as follows: (1) a catalytic composite comprising a combination of 0.1 wt. % indium, 0.25 wt. % tin, 0.6 wt. % platinum, and about 0.5 to about 1.5 wt. % halogen with an alumina carrier material; (atomic ratio In to Pt = 0.28:1); ); (2) a catalytic composite comprising a combination of 0.05 wt. % indium, 0.375 wt. % platinum, 0.5 wt. % germanium and about 0.5 to about 1.5 wt. % halogen with an alumina carrier material: (atomic ratio In to Pt = 0.225:1); (3) a catalytic composite comprising a combination of about 0.2 wt. % indium, 0.375 wt. % platinum, 0.2 wt. % tin, and about 0.5 to about 1.5 wt. % halogen with an alumina carrier material (atomic ratio In to Pt = 0.9:1); (4) a catalytic composite comprising a combination of 0.5 wt. % indium, 0.75 wt. % platinum, 0.5 weight % tin and about 0.5 to about 1.5 wt. % halogen with an alumina carrier material (atomic ratio In to Pt = 1.14:1); (5) a catalytic composite comprising a combination of 0.6 wt. % platinum, 0.2 wt. % indium, 0.2 wt. % germanium and about 0.5 to about 1.5 wt. % halogen with an alumina carrier material (atomic ratio In to Pt = 0.56:1); and, (6) a catalytic composite comprising a combination of 0.1 wt. % indium, 0.375 wt. % platinum, 0.1 wt. % lead and about 0.5 to about 1.5 wt. % halogen with an alumina carrier material (atomic ratio In to Pt = 0.45:1). The amounts of the components reported in these examples are, of course, calculated on an elemental basis.

Regardless of the details of how the components of the catalyst are combined with the porous carrier material, the final catalyst generally will be dried at a temperature of about 200° to about 600° F. for a period of at least about 2 to 24 hours or more, and finally calcined or oxidized at a temperature of about 700° F. to about 1100° F. in an air atmosphere for a period of about 0.5 to about 10 hours in order to convert substantially all of the metallic components to the corresponding oxide forms. Because a halogen component is utilized in the catalyst, best results are generally obtained when the halogen content of the catalyst is adjusted during the calcination step by including a halogen or a decomposable halogen-containing, halide-producing compound in the air atmosphere utilized. In particular, when the halogen component of the catalyst is combined chloride, it is preferred to use a mole ratio of $H_2O$ to HCl or equivalent of about 5:1 to about 100:1 during at least a portion of the calcination step in order to adjust the final chlorine content of the catalyst to a range of about 0.1 to about 3.5 wt %.

It is an essential feature of the present invention that the resultant oxidized catalytic composite is subjected to a substantially water-free reduction step prior to its use in the conversion of hydrocarbons. This step is designed to insure a uniform and finely divided dispersion of the metallic components throughout the carrier material and to selectively reduce the platinum group component to the corresponding metal while maintaining substantially all of the indium component and of the Group IVA metallic component (if it is used) in a positive oxidation state. Preferably, substantially pure and dry hydrogen (i.e. less than 20 vol. ppm. $H_2O$) is used as the reducing agent in this step. The reducing agent is contacted with the oxidized catalyst at conditions including a temperature of about 800° F. to about 1200° F., a gas hourly space velocity of about 100 to about 5000 hr. $^{-1}$, and a period of time of about 0.5 to 10 hours effective to reduce substantially all of the platinum group component to the elemental metallic state while maintaining substantially all of the indium component and of the Group IVA metallic component (if it is used) in an oxidation state above that of the corresponding elemental metal. This reduction treatment may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding operation designed to incorporate in the catalytic composite from about 0.5 to about 0.5 wt. % sulfur, calculated on an elemental basis, in the form of the adsorbed or chemisorbed sulfide. Preferably, this presulfiding treatment takes place in the presence of hydrogen and a suitable sulfur-containing and metallic sulfide-producing compound such as hydrogen sulfide, lower molecular weight mercaptans, organic sulfides, disulfides, etc. Typically, this procedure comprises treating the selectively reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more. It is generally a good practice to perform this presulfiding step under substantially water-free conditions.

According to the present invention, a hydrocarbon charge stock and hydrogen are contacted with the catalyst of the present invention in a hydrocarbon conversion zone. This contacting may be accomplished by using the catalyst in a fixed bed system, a moving bed system, a fluidized bed system, or in a batch type operation; however, in view of the danger of attrition losses of the valuable catalyst, and of well known operational advantages, it is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case where the catalyst of the present invention is used in a reforming operation, the reforming system will comprise a reforming zone containing a fixed bed of the catalyst type previously characterized. The reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha — for example, a naphtha boiling in the range of $C_7$ to 400° F. In some cases, it is also advantageous to charge pure hydrocarbons or mixtures of hydrocarbons that have been extracted from hydrocarbon distillates — for example, straight-chain paraffins — which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous and water-yielding contaminants therefrom and to saturate any olefins that may be contained therein.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane-rich stock, or an n-hexane-rich stock, or a mixture of xylene isomers, etc. In a dehydrogenation embodiment, the charge stock can be any of the known dehydrogenable hydrocarbons such as an aliphatic compound containing 2 to 30 carbon atoms per molecule, a $C_4$ to $C_{30}$ normal paraffin, a $C_8$ to $C_{12}$ alkylaromatic, a naphthene and the like. In hydrocracking embodiments, the charge stock will be typically a gas oil, heavy cracked cycle oil, etc. In addition alkylaromatic and naphthenes can be conveniently isomerized by using the catalyst of the present invention. Likewise, pure hydrocarbons or substantially pure hydrocarbons can be converted to more valuable products by using the catalyst of the present invention in any of the hydrocarbon conversion processes, known to the art, that use a dual-function catalyst.

In a reforming embodiment, it is generally preferred to utilize the instant catalytic composite in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 50 ppm. and preferably less than 20 ppm.; expressed as weight of equivalent water in the charge stock. In general, this can be accomplished by careful control of the water present in the charge stock in the hydrogen stream. The charge stock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. Preferably, the charge stock is dried to a level corresponding to less than 20 ppm. of $H_2O$ equivalent. In general, it is preferred to maintain the hydrogen stream entering the hydrocarbon conversion zone at a level of about 10 to about 20 vol. ppm. of water or less. In the case where the water content of the hydrogen stream is above this range, this can be conveniently accomplished by contacting the hydrogen stream with a suitable desiccant such as those mentioned above at conventional drying conditions.

In the reforming embodiment, an effluent stream is withdrawn from the reforming zone and passed through a cooling means to a separation zone, typically maintained at about 25° to 150° F., wherein a hydrogen-rich gas is separated from a high octane liquid product, commonly called an "unstabilized reformate". When a super-dry operation is desired, at least a portion of this hydrogen-rich gas is withdrawn from the separating zone and passed through an adsorption zone containing an adsorbent selective for water. The resultant substantially water-free hydrogen stream can then be recycled through suitable compressing means back to the reforming zone. The liquid phase from the separating zone is typically withdrawn and commonly treated in a fractionating system in order to adjust the butane concentration, thereby controlling frontend volatility of the resulting reformate.

The conditions utilized in the numerous hydrocarbon conversion embodiments of the present invention are those customarily used in the art for the particular reaction, or combination or reactions, that is to be effected. For instance, alkylaromatics and paraffin isomerization conditions include: a temperature of about 32° F. to about 1000° F. and preferably about 75° F. to about 600° F.; a pressure of atmospheric to about 100 atmospheres; a hydrogen to hydrocarbon mole ratio of about 0.5:1 to about 20:1 and a LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include a temperature of about 700° to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. LIkewise, typically hydrocracking conditions include: a pressure of about 500 psig. to about 3000 psig.; a temperature of about 400° F. to about 900° F.; a LHSV of about 0.1 hr.$^{-1}$ to about 10 hr.$^{-1}$; and hydrogen circulation rates of about 1000 to 10,000 SCF per barrel of charge.

In the reforming embodiment of the present invention the pressure utilized is selected from the range of about 0 psig. to about 1000 psig., with the preferred pressure being about 50 psig. to about 500 psig. Particularly good results are obtained at low pressure; namely, a pressure of about 50 to 350 psig. In fact, it is a singular advantage of the present invention that it allows stable operation at lower pressure than have heretofore been successfully utilized in so-called "continuous" reforming systems; (i.e. reforming for periods of about 15 to about 200 or more barrels of charge per pound of catalyst without regeneration) with all platinum monometallic catalysts. In other words, the catalyst of the present invention allows the operation of a continuous reforming system to be conducted at low pressure (i.e. 100 to about 350 psig.) for about the same or better catalyst life before regeneration as has been heretofore realized with conventional monometallic catalysts at higher pressures (i.e. 400 to 600 psig.). On the other hand, the stability feature of the present invention enables reforming operations conducted at pressures of 400 to 600 psig. to achieve substantially increased catalyst life before regeneration.

Similarly, the temperature required for reforming is generally lower than that required for a similar reforming operation using a high quality catalyst of the prior art. This significant and desirable feature of the present invention is a consequence of the selectivity of the catalyst of the present invention for the octane-upgrading reactions that are preferably induced in a typical reforming operation. Hence the present invention requires a temperature in the range of from about 800° F. to about 1100° F. and preferably about 900° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product, is substantially lower for the catalyst of the present invention than for a high quality reforming catalyst which is manufactured in exactly the same manner as the catalyst of the present invention except for the inclusion of the indium component. Moreover, for the catalyst of the present invention, the $C_5$+ yield loss for a given temperature increase is substantially lower than for a high quality reforming catalyst of the prior art. In addition, hydrogen production is substantially higher.

The reforming embodiment of the present invention also typically utilizes sufficient hydrogen to provide an amount of about 1 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$, with a value in the range of about 1 to about 5 hr.$^{-1}$ being preferred. In fact, it is a feature of the present invention that it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

The following working examples are given to illustrate further the preparation of the catalytic composite of the present invention and the use thereof in the conversion of hydrocarbons. It is understood that the examples are intended to be illustrative rather than restrictive.

EXAMPLE I

This example demonstrates a particularly good method of preparing the especially preferred trimetallic catalytic composite of the present invention.

A tin-containing alumina carrier material comprising one-eighteenth inch spheres is prepared by: forming an aluminum hydroxyl chloride sol by dissolving substantially pure aluminum pellets in hydrochloric acid, adding stannic chloride to the resulting sol in an amount selected to result in a finished catalyst containing about 0.5 wt. % tin, adding hexamethylenetetramine to the resulting tin-containing alumina sol, gelling the resulting solution by dropping it into an oil bath to form spherical particles of an aluminum- and tin-containing hydrogel; aging and washing the resulting particles and finally drying and calcining the aged and washed particles to form spherical particles of gamma-alumina containing a uniform dispersion of about 0.5 wt. % tin in the form of tin oxide and about 0.3 wt. % combined chloride. Additional details as to this method of preparing the preferred gamma-alumina carrier material are given in the teachings of U.S. Pat. No. 2,620,314

An aqueous impregnation solution containing chlorplatinic acid, indium trichloride and hydrogen chloride is then prepared. The tin-containing alumina carrier material is thereafter admixed with the impregnation solution. The amount of reagents contained in this impregnation solution is calculated to result in a final composite containing, on an elemental basis, 0.375 wt. % platinum, 0.22 wt. % indium, and 0.5 wt. % tin. In order to insure uniform dispersion of the metallic components throughout the carrier material, the amount of hydrochloric acid used is about 3 wt. % of the alumina particles. This impregnation step is performed by adding the carrier material particles to the impregnation mixture with constant agitation. In addition, the volume of the solution is approximately the same as the volume of the carrier material particles. The impregnation mixture is maintained in contact with the carrier material particles for a period of about one-half hour at a temperature of about 70° F. Thereafter, the temperature of the impregnation mixture is raised to about 225°

F. and the excess solution evaporated in a period of about 1 hour. The resulting dried particles are then subjected to a calcination or oxidation treatment in an air atmosphere at a temperature of about 975° F. for about 1 hour. This oxidation step is designed to convert substantially all of the metallic ingredients to the corresponding oxide forms. The calcined spheres are then contacted with an air stream containing $H_2O$ and HCl in a mole ratio of about 30:1 for about 4 hours at 975° F. in order to adjust the halogen content of the catalyst particles to a value of about 1 wt. %

The resulting catalyst particles are analyzed and found to contain, on an elemental basis, about 0.375 wt. % platinum, about 0.22 wt. % indium, about 0.5 wt. % tin and about 1 wt. % combined chloride. For this catalyst, the atomic ratio of tin to platinum is 2.19:1 and the atomic ratio of indium to platinum is 1:1.

Thereafter, the catalyst particles are subjected to a dry pre-reduction treatment, designed to reduce the platinum component to the corresponding elemental metallic state while maintaining the indium and tin components in positive oxidation states, by contacting them for 1 hour with a substantially pure hydrogen stream containing less than 5 vol. ppm. $H_2O$ at a temperature of about 1050° F., a pressure slightly above atmospheric, and a flow rate of the hydrogen stream through the catalyst particles corresponding to a gas hourly space velocity of about 720 hr.$^{-1}$.

EXAMPLE II

A portion of the spherical trimetallic catalyst particles produced by the method described in Example I are loaded into a scale model of a continuous, fixed bed reforming plant of conventional design. In this plant a heavy Kuwait naphtha and hydrogen are continuously contacted at reforming conditions: a liquid hourly space velocity of 1.5 hr.$^{-1}$; a pressure of 100 psig.; a hydrogen to hydrocarbon mole ratio of 5:1 and a temperature sufficient to continuously produce a $C_5+$ reformate of 102 F-1 clear. It is to be noted that these are exceptionally severe conditions.

The heavy Kuwait naphtha has an API gravity at 60° F. of 60.4, an initial boiling point of 184° F., a 50% boiling point of 256° F., and an end boiling point of 360° F. In addition, it contains about 8 vol. % aromatics, 71 vol. % paraffins, 21 vol. % naphthenes, 0.5 wt. % parts per million sulfur, and 5 to 8 wt. parts per million water. The F-1 clear octane number of the raw stock is 40.0.

The fixed bed reforming plant is made up of a reactor containing the trimetallic catalyst, a hydrogen separation zone, a debutanizer column, and suitable heating, pumping, cooling and controlling means. In this plant, a hydrogen recycle stream and the charge stock are commingled and heated to the desired temperature. The resultant mixture is then passed downflow into a reactor containing the trimetallic catalyst as a fixed bed. An effluent stream is then withdrawn from the bottom of the reactor, cooled to about 55° F. and passed to a separating zone wherein a hydrogen-rich gaseous phase separates from a liquid hydrocarbon phase. A portion of the gaseous phase is continuously passed through a high surface area sodium scrubber and the resulting water-free hydrogen stream recycled to the reactor in order to supply hydrogen thereto, and the excess hydrogen over that needed for plant pressure is recovered as excess separator gas. The liquid hydrocarbon phase from the hydrogen separating zone is withdrawn therefrom and passed to a debutanizer column of conventional design wherein light ends are taken overhead as debutanizer gas and $C_5+$ reformate stream recovered as bottoms.

The test run is continued for a catalyst life of about 20 barrels of charge per pound of catalyst utilized, and it is determined that the activity, selectivity and stability of the present trimetallic catalyst are vastly superior to those observed in a similar type test with a conventional commercial reforming catalyst. More specifically, the results obtained from the subject catalyst are superior to the platinum metal-containing catalyst of the prior art in the areas of hydrogen production, $C_5+$ yield at octane, average rate of temperature increase necessary to maintain octane, and $C_5+$ yield decline rate.

EXAMPLE III

This example demonstrates a preferred method of preparing the acidic bimetallic catalytic composite of the present invention.

An alumina carrier material comprising one-sixteenth inch spheres was prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of alumina hydrogel. The resulting hydrogel particles were then aged and washed with an ammoniacal solution and finally dried and calcined at an elevated temperature to form spherical particles of gamma-alumina containing 0.3 wt. % combined chloride. Additional details as to this method of preparing the preferred carrier material are given in the teachings of U.S. Pat. No. 2,620,314.

An aqueous solution containing chloroplatinic acid, indium trichloride and hydrochloric acid was then prepared. The amounts of the reagents contained in the resulting impregnation solution were carefully adjusted to result in a composite containing 0.05 wt. % indium and 0.375 wt. % platinum. In addition, the amount of hydrochloric acid was about 2 wt. % of the alumina particles. The resulting impregnation solution was then contacted with the gamma-alumina particles in a vessel maintained at room temperature. In order to insure uniform distribution of the metallic components throughout the carrier material, this impregnation step was performed by adding the carrier material particles to the impregnation mixture with constant agitation. In addition, the volume of the solution was about two times the volume of the carrier material particles. The impregnation mixture was maintained in contact with the carrier material particles for a period of about 1.2 hours at a temperature of about 70° F. Thereafter, the temperature of the impregnation mixture was raised to about 225° F. and the excess solution was evaporated in a period of about 1 hour. The resulting dried particles were then subjected to an oxidation treatment in an air atmosphere at a temperature of about 925° F. for about 1 hour in order to convert the metallic components to the corresponding oxide forms. The oxidized spheres were then contacted with an air stream containing $H_2o$ and HCl in a mole ratio of about 40:1 for about 4 hours at 975° F. in order to adjust the halogen content of the catalyst particles to a value of about 0.9.

The resulting catalyst particles were analyzed and found to contain, on an elemental basis, about 0.375 wt. % platinum, about 0.05 wt. % indium and about 0.88 wt. % chloride. On an atomic basis, the ratio of indium to platinum was 0.225:1.

Thereafter, the catalyst particles were subjected to a dry reduction treatment designed to reduce substantially all of the platinum component to the elemental state while maintaining substantially all of the indium component in a positive oxidation state by contacting them with a substantially pure hydrogen stream containing less than 20 vol. ppm. $H_2O$ at a temperature of about 1000° F., a pressure slightly above atmospheric and a flow rate of the hydrogen stream through the catalyst particles corresponding to a gas hourly space velocity of about 720 hr.$^{-1}$. This prereduction step was for a duration of about 1 hour. The resulting catalyst is designated catalyst A.

EXAMPLE IV

The experiment described in Example III was repeated except that the amounts of the reagents present in the impregnation solution were adjusted to prepare a catalyst containing 0.11 wt. % indium, 0.375 wt. % platinum and 0.92 wt. % chlorine. The resulting catalyst is designated catalyst B. The atomic ratio of indium to platinum was 0.5:1.

EXAMPLE V

The experiment described in Example III was repeated except that the amount of the reagents present in the impregnation solution were adjusted to prepare a catalyst containing 0.22 wt. % indium, 0.375 wt. % platinum and 1.01 wt. % chlorine. The atomic ratio of indium to platinum was 1:1. The resulting catalyst is designated catalyst C.

EXAMPLE VI

In order to compare the novel catalysts of the present invention with a platinum-containing catalyst, a comparison test was made between the catalysts of the present invention, catalysts A, B and C, and a reforming catalyst of the prior art which contained platinum as its sole hydrogenation-dehydrogenation component. That is, the control catalyst was a combination of platinum and chlorine with a gamma-alumina carrier material which was prepared by an impregnation procedure analogous to that given in Example III and contained, on an elemental basis about 0.75 wt. % platinum and about 0.86 wt. % chlorine.

These catalysts were then separately subjected to a high stress evaluation test designed to determine their relative activity and selectivity for the reforming of a gasoline charge stock. In all tests the same charge stock was utilized; its characteristics are given in Table I. It is to be noted that this test was conducted under a substantially water-free condition with the only significant source of water being the 5.9 wt. ppm. present in the charge stock.

Table I

| Analysis of Heavy Kuwait Naphtha | |
| --- | --- |
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |

Table I-continued

| Analysis of Heavy Kuwait Naphtha | |
| --- | --- |
| Sulfur, wt. ppm. | 0.5 |
| Nitrogen, wt. ppm. | 0.1 |
| Aromatics, vol. % | 8 |
| Paraffins, vol. % | 71 |
| Naphthenes, vol. % | 21 |
| Water, ppm. | 5.9 |
| Octane no., F-1 clear | 40.0 |

This test was specifically designed to determine in a very short time period whether the catalyst being evaluated has superior characteristics for the reforming process. It consisted of 6 test periods which were each of 10 hour duration. The first three periods were run at a temperature of about 970° F. Then, after a line-out period, the last three periods were run at a constant temperature of about 1,000° F. It was performed in a laboratory scale reforming plant comprising a reactor containing the catalyst, hydrogen separation zone, a debutanizer column, suitable heating, pumping and condensing means, etc.

In this plant, a hydrogen recycle stream and the charge stock are commingled and heated to the desired conversion temperature. The resulting mixture is then passed downflow into a reactor containing the catalyst as a fixed bed. An effluent stream is then withdrawn from the bottom of the reactor, cooled to about 55° F., and passed to the separating zone wherein a hydrogen-rich gaseous phase is continuously passed through a high surface area sodium scrubber and the resulting substantially water-free hydrogen stream recycled to the reactor in order to supply hydrogen for the reaction, and the excess over that needed for plant pressure is recovered as excess separator gas. Moreover, the liquid phase from the separating zone is withdrawn therefrom and passed to the debutanizer column wherein light ends are taken overhead as debutanizer column wherein light ends are taken overhead as debutanizer gas and a $C_5+$ reformate stream recovered as bottoms.

Conditions utilized in this test were: a constant temperature of about 970° F. for the first three periods followed by a constant temperature of about 1000° F. for the last three periods, a liquid hourly space velocity of 3.0 hr.$^{-1}$, an outlet pressure of the reactor of 100 psig., and a mole ratio of hydrogen to hydrocarbon entering the reactor of 6:1 for catalysts A and B and 8:1 for catalyst C and the control catalyst. This two-temperature test is designed to quickly and efficiently yield two points on the yield-octane curve for the particular catalysts. The conditions utilized are selected on the basis of experience to yield the maximum amount of information on the capability of the catalyst being tested to respond to a high severity operation.

The results of the separate tests performed on the catalysts of the present invention and the control catalyst are presented for each test period in Table II in terms of inlet temperature to the reactor in ° F., net excess separator gas in standard cubic feet per barrel of charge (SCF/bbl), debutanizer overhead gas in standard cubic feet per barrel, the ratio of the debutanizer gas make to the total gas make, and F-1 clear octane number of the $C_5+$ reformate.

TABLE II

RESULTS OF ACCELERATED REFORMING TESTS

| Period No. | T, °F. | Separator Gas SCF/bbl | Debutanizer Gas SCF/bbl | Debut. Gas/Total Gas Ratio | Octane No. F-1 Clear |
|---|---|---|---|---|---|
| Catalyst A—0.375 wt. % Pt. 0.05 wt. % In and 0.88 wt. % Cl. | | | | | |
| 1 | 971 | 1360 | 74 | .051 | 95.2 |
| 2 | 971 | 1330 | 72 | .052 | 94.6 |
| 3 | 968 | 1272 | 69 | .051 | 92.9 |
| 4 | 1004 | 1431 | 88 | .058 | 97.0 |
| 5 | 1002 | 1374 | 101 | .068 | 96.5 |
| 6 | 1002 | 1291 | 91 | .068 | 95.0 |
| Catalyst B—0.375 wt. % Pt., 0.11 wt. % In and 0.92 wt. % Cl. | | | | | |
| 1 | 969 | 1513 | 81 | .053 | 96.2 |
| 2 | 969 | 1450 | 82 | .051 | 95.0 |
| 3 | 968 | 1411 | 80 | .056 | 94.4 |
| 4 | 1003 | 1598 | 98 | .062 | 98.0 |
| 5 | 1004 | 1553 | 97 | .063 | 97.5 |
| 6 | 1003 | 1521 | 102 | .067 | 96.7 |
| Catalyst C*—0.375 wt. % Pt. 0.22 wt. % In and 1.01 wt. % Cl. | | | | | |
| 1 | 970 | 1438 | 65 | .044 | 95.1 |
| 2 | 968 | 1370 | 64 | .045 | 94.5 |
| 3 | 968 | 1361 | 68 | .048 | 94.0 |
| 4 | 1002 | 1532 | 83 | .051 | 98.7 |
| 5 | 1004 | 1471 | 87 | .056 | 97.6 |
| 6 | 1004 | 1513 | 93 | .058 | 96.5 |
| Control Catalyst*—0.75 wt. % Pt and 0.86 wt. % Cl. | | | | | |
| 1 | 970 | 1556 | 83 | .051 | 94.5 |
| 2 | 968 | 1453 | 86 | .056 | 93.4 |
| 3 | 968 | 1362 | 81 | .056 | 93.3 |
| 4 | 995 | 1465 | 109 | .069 | 97.3 |
| 5 | 995 | 1429 | 111 | .072 | 96.9 |
| 6 | 1000 | 1379 | 111 | .074 | 96.4 |

*Catalyst "C" and Control Catalyst run $H_2$/HC ratio of 8:1; catalysts "A" and "B" run at $H_2$/HC ratio of 8:1.

Referring now to the results of the separate tests presented in Table II, it is evident that the principal effect of the indium component on the catalyst is to substantially promote the platinum metal component and to enable a catalyst containing less platinum to out-perform a catalyst containing a substantially greater amount of platinum. That is, the catalysts of the present invention are superior to the control catalyst in both activity and selectivity. As was pointed out hereinbefore, a good measure of activity for a reforming catalyst is octane number of reformate produced at the same conditions; on this basis, the catalysts of the present invention were clearly more active than the control catalyst at both temperatures, particularly when the fact that catalysts A and B are run at materially more severe conditions than the control catalyst is accounted for. However, activity is only half of the story; activity must be coupled with selectivity to demonstrate superiority. Selectivity is measured directly by reference to $C_5+$ yield and indirectly by reference to separator gas make, which is roughly proportional to net hydrogen make, which in turn, is a product of the preferred upgrading reactions, and by reference to debutanizer gas make which is a rough measure of undesired hydrocracking and should be minimized for a highly selective catalyst. Referring again to the data presented in Table II, allowing for the more severe conditions used with catalysts A and B and using the selectivity criteria, it is manifest that the catalysts of the present invention are more selective than the control catalyst at both temperature conditions.

From the consideration of this data, it is clear that an indium component can provide an efficient and effective promoter of a platinum metal reforming catalyst.

EXAMPLE VII

In order to study the extent of the beneficial interaction of indium with platinum in a bimetallic reforming catalyst of the type described, a catalyst was prepared which possessed an indium to platinum atomic ratio of 1.35:1. The catalyst, designated catalyst D, was prepared according to procedure previously given in Example III except that the amounts of the ingredients in the impregnation solution were adjusted in order to result in a catalyst containing 0.375 wt. % platinum, 0.3 wt. % indium and 1.03 wt. % chlorine.

Catalyst D was then subjected to a high severity reforming test in the same manner as described in Example VI. The results of this test along with results for the control catalyst, are presented in Table III in the same terms as used in Table II.

TABLE III

| Period No. | T, °F. | Separator Gas SCF/bbl | Debutanizer Gas SCF/bbl | Debut.Gas/Total Gas Ratio | Octane No. F-1 Clear |
|---|---|---|---|---|---|
| Catalyst "D"—0.375 wt. % Pt, 0.3 wt. % In and 1.03 wt. % Cl. | | | | | |
| 1 | 973 | 1497 | 67 | .043 | 94.6 |
| 2 | 973 | 1404 | 68 | .046 | 93.3 |
| 3 | 973 | 1335 | 78 | .052 | 90.9 |
| 4 | 1007 | 1346 | 92 | .064 | 94.0 |
| 5 | 1007 | 1207 | 98 | .075 | 91.5 |
| 6 | 1007 | 1117 | 104 | .085 | 88.5 |
| Control Catalyst—0.75 wt. % Pt and 0.86 Wt. % Cl. | | | | | |
| 1 | 970 | 1556 | 83 | .051 | 94.5 |
| 2 | 968 | 1453 | 86 | .056 | 93.4 |
| 3 | 968 | 1362 | 81 | .068 | 93.3 |
| 4 | 995 | 1465 | 109 | .069 | 97.3 |
| 5 | 995 | 1429 | 111 | .072 | 96.9 |

TABLE III-continued

| Period No. | T, °F. | Separator Gas SCF/bbl | Debutanizer Gas SCF/bbl | Debut.Gas/Total Gas Ratio | Octane No. F-1 Clear |
|---|---|---|---|---|---|
| 6 | 1000 | 1379 | 111 | .074 | 96.4 |

With reference now to the results presented in Table III, it can be seen that the performance of catalyst D was inferior to the control catalyst in both activity and selectivity characteristics. As previously explained, activity is conveniently measured by octane number, and on this basis catalyst D was materially less active than the control catalyst at both temperature conditons. Specifically, catalyst D achieved an average octane of 92.9 at 970° F. and an average octane of 91.3 at 1000° F. In sharp contrast, the control catalyst achieved 93.7 at 970° F. and 96.8 at 1000° F.

Likewise, using the criteria for selectivity previously discussed, it can be ascertained that the control catalyst was more selective than catalyst D at the higher temperature and approximately as selective at the low temperature.

From this comparison data and the results presented in Example IV, it can be concluded that the beneficial effect of indium is not obtained with a catalyst having an indium to platinum atomic ratio of 1.35:1 or more.

It is intended to cover by the following claims all changes and modifications of the above disclosure of the present invention which would be self-evident to a man of ordinary skill in the catalyst formulation art or in the hydrocarbon conversion art.

I claim as my invention:

1. A catalytic composite comprising a porous carrier material containing, on an elemental basis, about 0.01 to about 2 wt. % platinum group metal, about 0.1 to about 3.5 wt. % halogen, about 0.01 to about 5 wt. % germanium or tin, and indium in an amount sufficient to result in an atomic ratio of indium to platinum group metal of about 0.1:1 to about 1:1, wherein the platinum group metal and indium are uniformly dispersed throughout the porous carrier material, wherein substantially all of the platinum group metal is present in the elemental metallic state, wherein substantially all of the indium and germanium or tin are present in an oxidation state above that of the corresponding elemental metal and wherein substantially all of the halogen is present in the form of combined halide.

2. A catalytic composite as defined in claim 1 wherein the platinum group metal is platinum.

3. A catalytic composite as defined in claim 1 wherein the platinum group metal is palladium.

4. A catalytic composite as defined in claim 1 wherein the platinum group metal is iridium.

5. A catalytic composite as defined in claim 1 wherein the halogen is combined chloride.

6. A catalytic composite as defined in claim 1 wherein the porous carrier material is a refractory inorganic oxide.

7. A catalytic composite as defined in claim 6 wherein the refractory inorganic oxide is alumina.

8. A catalytic composite as defined in claim 1 wherein the catalytic composite contains about 0.05 to about 0.5 wt. % sulfur, calculated on an elemental basis.

9. A catalytic composite as defined in claim 1 wherein the composite contains, on an elemental basis, about 0.05 to about 1 wt. % platinum group metal, about 0.5 to about 1.5 wt. % halogen and an atomic ratio of indium to platinum group metal of about 1:1.

10. A catalytic composite as defined in claim 1 wherein substantially all of the germanium or tin is present in the catalytic composite as the corresponding metal oxide.

11. A catalytic composite as defined in claim 1 wherein the atomic ratio of germanium or tin to platinum group metal contained in the composite is about 0.05:1 to about 10:1.

12. A catalytic composite as defined in claim 1 wherein the catalytic composite contains about 0.05 to about 1 wt. % platinum group metal, about 0.05 to about 2 wt. % germanium or tin, about 0.5 to about 1.5 wt. % halogen and an atomic ratio of indium to platinum group metal of about 1:1.

* * * * *